3,333,006
METHOD OF PREPARATION OF VINYLETHYL SULPHONE

Vladimir Zinovjevich Sharf, Lev Khatskelevich Freidlin, Elena Nickolaevna Prilezhaeva, Anastasija Vasiljevna Sviridova, and Raisa Jakovlevna Tolchinskaja, Moscow, U.S.S.R., assignors to Institute organicheskoi Khimii im N.D. Zelinskogo
No Drawing. Filed May 5, 1964, Ser. No. 365,142
2 Claims. (Cl. 260—607)

This invention relates to the preparation of vinylethyl sulphone by catalytic dehydration of 2-hydroxydiethyl sulphone in a continuous process.

Prior to the invention several methods of preparation of vinylethyl sulphone have been known, e.g. by oxidation of $\alpha,\beta$ unsaturated sulphones, by removal of HX from compounds of $RSO_2CH_2\text{—}CH_2X$ type where X is OH, Cl, $CH_3COO$, $SO_3H$, or by dehydration of 2-hydroxydiethyl sulphone.

The first two processes are very complicated. For instance, oxidation of alkylvinyl sulphone is carried out usually by concentrated hydrogen peroxide in a medium of tertbutyl alcohol in the presence of selenium dioxide.

Methods of dehydrochlorination of $\beta$-chloroethyl alkylsulphones by means of zinc dust, alkalies or amines involve in some cases the stages of formation of tetrammonium bases. Toxic yperites and semi-yperites are often used as intermediate products.

Processes, where $\beta$-hydroxyethyl sulphones are converted to sulphuric esters or acetates with subsequent removal of the acidic residue by the action of alkalies or by pyrolysis are multistage processes.

Direct dehydration of 2-hydroxydiethyl sulphone is a more simple process.

Two processes for dehydration of 2-hydroxydiethyl sulphone are known: with the use of concentrated orthophosphoric acid at 260–270° C. and at 15–22 mm. Hg residual pressure, and by catalytic dehydration over aluminum oxide at 240–260° C. and at 10 mm. Hg residual pressure.

The yields of vinylethyl sulphone by these methods are 70–75% and 77% respectively.

The drawback of the first process is in that it is a batch process, which moreover requires the use of acid resistant equipment and the reaction mixture is heavily deteriorated with tar.

The disadvantage of the second process is that the catalyst is poisoned and hence there is a decrease in vinylethyl sulphone yields.

Attempts have been made to overcome these disadvantages. Thus we investigated the catalytic dehydration of 2-hydroxydiethyl sulphone in a pass-through system under atmospheric pressure in the presence of various dehydration catalysts. The effect of temperature and flow rates on vinylethyl sulphone yields was also investigated. We examined also the stability of the catalysts and the polymerizing properties of the obtained vinylethyl sulphone.

We have found that dehydration of 2-hydroxydiethyl sulphone without diluents causes heavy tar-deterioration of the catalyst which is thus very rapidly inactivated.

Water as diluent was used in the dehydration, but this leads to a rapid poisoning of the catalyst.

Vinylethyl sulphone obtained over aluminum oxide displays low polymerizing activity.

We have found that tribasic calcium phosphate is an active and stable catalyst in the process of 2-hydroxydiethyl sulphone dehydration.

The object of this invention is to provide a continuous process for the preparation of vinylethyl sulphone.

Another object of the invention is to discover an active catalyst which would not be poison-contaminated in the reaction.

Still another object of the invention is to obtain easily polymerizable vinylethyl sulphone.

The proposed process consists in dehydration of 2-hydroxydiethyl sulphone in the presence of tribasic calcium phosphate as a catalyst.

The process should be preferably carried out in the presence of water vapor as a diluent, the volume ratio of 2-hydroxydiethyl sulphone to water being 1:1, and at a temperature of 350° C. and atmospheric pressure.

The yield of the product in this case is 80% with reference to the handled and 85% with reference to the converted 2-hydroxydiethyl sulphone.

It has been discovered that the life of the catalyst lasts many dozens of hours without diminishing the catalytic activity. The quality of the obtained product was judged by its ability to polymerize. Polymerization was carried out in a sealed tube in a nitrogen atmosphere in the presence of 1% of azoisobutyronitrile for six hours at 60° C.

For the purpose of comparison below are given the results of polymerization of vinylethyl sulphone obtained by various methods. Before polymerization, vinylethyl sulphone was distilled in vacuum and followed by freezing out in ether.

| Catalyst: | Polymer yield, percent |
|---|---|
| Aluminum oxide | 57 |
| Calcium phosphate, tribasic | 82 |
| Ortho-phosphoric acid | 82.6 |

As it is seen from the table, vinylethyl sulphone, obtained by a continuous process in the presence of tricalcium phosphate catalyst, displays equally good polymerizing properties as vinylethyl sulphone prepared with the aid of ortho-phosphoric acid.

These polymers find wide application in the production of benzine resistant rubbers.

The proposed process can be carried out as a continuous flow-process as follows:

In a tube of the catalytic furnace is charged the catalyst, tribasic calcium phosphate, in the form of 2 x 3 mm. granules dried at 100–110° C. and calcined for two hours at a temperature of 400–450° C. An aqueous solution of 2-hydroxydiethyl sulphone (1:1) is passed through the tube at a 2.4 hour$^{-1}$ flow-rate and at a temperature of 350° C.

Vinylethyl sulphone and nonreacted 2-hydroxydiethyl sulphone are recovered from the reaction product by fractionation.

To make the invention more understandable for those skilled in the art the following examples are presented.

Example 1

Commercial tricalcium phosphate was granulated to 2 x 3 mm. size, dried at 100–110° C. and calcined for two hours at 400–450° C. 20 ml. of the catalyst was charged into a 20 mm. dia. tube in the catalytic furnace. 55.6 g. of 2-hydroxydiethyl sulphone mixed with an equal volume of water was passed over the catalyst at a 2.0 hour$^{-1}$ rate at a temperature of 350° C.

Vinylethyl sulphone, 37.6 g. and nonreacted 2-hydroxydiethyl sulphone, 2.88 g. were fractionated from the reaction product.

The yield of vinylethyl sulphone was 78% with reference the handled and 83% with reference to the converted 2-hydroxydiethyl sulphone.

Example 2

Commercial tricalcium phosphate was granulated to 2 x 3 mm. size, dried at 100–110° C. and calcined for two hours at 400–450° C. 20 ml. of the catalyst was charged into a 20 mm. dia. tube in the catalytic furnace. 55.6 g. of 2-hydroxydiethyl sulphone mixed with an equal volume of water was passed over the catalyst at 2.4 hour$^{-1}$ rate at a temperature of 300° C.

29.4 g. of vinylethyl sulphone was obtained from the reaction products. The yield of vinylethyl sulphone was 61% with reference to the handled 2-hydroxydiethyl sulphone.

*Example 3*

Commercial tricalcium phosphate was granulated to 2 x 3 mm. size, dried at 100–110° C. and calcined for two hours at 400–450° C. 20 ml. of the catalyst was charged into a 20 mm. dia. tube in the catalytic furnace. 55.6 g. of 2-hydroxydiethyl sulphone mixed with an equal volume of water was passed over the catalyst at a 1.5 hour$^{-1}$ rate at a temperature of 350° C.

Vinylethyl sulphone, 38.2 g. and nonreacted 2-hydroxydiethyl sulphone, 5.07 g. were fractionated from the reaction product.

The yield of vinylethyl sulphone was 79% with reference to the handled and 88% with reference to the reacted 2-hydroxydiethyl sulphone.

*Example 4*

Commercial tricalcium phosphate was granulated to 2 x 3 mm. size, dried at 100–110° C. and calcined for two hours at 400–450° C.

20 ml. of the catalyst was charged into a 20 mm. dia. tube in the catalytic furnace. 834 g. of 2-hydroxydiethyl sulphone mixed with an equal volume of water was passed over the catalyst at a temperature of 350° C. for 30 hours.

Vinylethyl sulphone, 580 g. and nonreacted 2-hydroxydiethyl sulphone, 41.4 g. were fractionated from the reaction product.

The yield of vinylethyl sulphone was 80% with reference to the handled and 85% with reference to the converted 2-hydroxydiethyl sulphone.

Although a specific embodiment of the invention has been disclosed in this description it should be understood that various changes and modification can readily occur to those skilled in the art without departing from the spirit of the invention and the scope thereof.

What we claim is:

1. A method for the preparation of vinylethylsulphone consisting essentially of a continuous process of dehydration of 2-hydroxydiethyl sulphone, which is carried out by passing an aqueous solution of the 2-hydroxydiethyl sulphone at atmospheric pressure over tribasic calcium phosphate in granular form at a temperature between 300 and 350° C.

2. A method as claimed in claim 1 wherein the volume ratio of the 2-hydroxydiethyl sulphone and the water is 1:1 in said aqueous solution.

References Cited

Berkman et al.: Catalysis, page 740 (1940).
Shostakovskii et al.: Chemical Abstracts, 55, 414 (1961).

CHARLES B. PARKER, *Primary Examiner.*

D. R. PHILLIPS, *Assistant Examiner.*